US009530290B2

(12) United States Patent
Hutchinson

(10) Patent No.: US 9,530,290 B2
(45) Date of Patent: Dec. 27, 2016

(54) APPARATUSES AND METHODS FOR PROVIDING VISUAL INDICATION OF DYNAMIC PROCESS FUEL QUALITY DELIVERY CONDITIONS WITH USE OF MULTIPLE COLORED INDICATOR LIGHTS

(71) Applicant: Fuel Guard Systems Corporation, Houma, LA (US)

(72) Inventor: Ray Hutchinson, Houma, LA (US)

(73) Assignee: Fuel Guard Systems Corporation, Houma, LA (US)

( * ) Notice: Subject to any disclaimer, the term of this patent is extended or adjusted under 35 U.S.C. 154(b) by 303 days.

(21) Appl. No.: 14/160,149

(22) Filed: Jan. 21, 2014

(65) Prior Publication Data

US 2014/0202580 A1 Jul. 24, 2014

Related U.S. Application Data

(60) Provisional application No. 61/754,208, filed on Jan. 18, 2013.

(51) Int. Cl.

*G01N 11/00* (2006.01)
*G08B 5/36* (2006.01)

(Continued)

(52) U.S. Cl.

CPC ................ *G08B 5/36* (2013.01); *B67D 7/342* (2013.01); *B67D 7/76* (2013.01);

(Continued)

(58) Field of Classification Search

CPC ... G08B 5/36; B67D 7/342; B67D 2007/0044; B67D 2007/00446

(Continued)

(56) References Cited

U.S. PATENT DOCUMENTS 3,221,248 A 11/1965 Batteau et al.
3,748,576 A 7/1973 Sigournay (Continued)

FOREIGN PATENT DOCUMENTS

AU 2008206281 B2 7/2008
EP 0440299 A1 8/1991

(Continued)

OTHER PUBLICATIONS

Author Unknown, "AFGUARD—Prototype Quality Guarantees Safety," Jul. 9, 2006, 17 pages.

(Continued)

*Primary Examiner* — Hezron E Williams
*Assistant Examiner* — Rodney T Frank
(74) *Attorney, Agent, or Firm* — Withrow & Terranova, PLLC

(57) ABSTRACT

Embodiments of the present disclosure include a fuel dispensing apparatus for delivering fuel from a fuel source, and related components, systems, and methods. As fuel is delivered from the fuel source, fuel quality is monitored using one or more fuel quality sensor devices, which detect one or more corresponding fuel quality characteristics. In response to the detected fuel quality characteristics, a visual indication of fuel quality is provided at a visual indication device. The visual indication includes a unique combination of a color component and a frequency component, thereby allowing a user of the fuel dispensing apparatus to quickly determine fuel quality status as the fuel is delivered from the fuel source.

15 Claims, 6 Drawing Sheets

(51) Int. Cl.
*B67D 7/34* (2010.01)
*B67D 7/76* (2010.01)
*B67D 7/04* (2010.01)

(52) U.S. Cl.
CPC .................. *B67D 2007/044* (2013.01); *B67D 2007/0446* (2013.01); *B67D 2007/0453* (2013.01)

(58) Field of Classification Search
USPC ........................................................ 73/53.01
See application file for complete search history.

(56) References Cited

U.S. PATENT DOCUMENTS

| | | | |
|---|---|---|---|
| 3,771,624 | A | 11/1973 | Forgeron |
| 3,824,823 | A | 7/1974 | Pontello |
| 3,876,307 | A | 4/1975 | Skala |
| 4,721,563 | A | 1/1988 | Rosaen |
| 4,723,049 | A | 2/1988 | Menard et al. |
| 4,814,087 | A | 3/1989 | Taylor |
| 4,934,565 | A | 6/1990 | Heisey et al. |
| 4,981,272 | A | 1/1991 | Cutore |
| 5,200,064 | A | 4/1993 | Russ et al. |
| 5,268,095 | A | 12/1993 | Barzuza |
| 5,437,256 | A | 8/1995 | Woletz et al. |
| 5,455,513 | A | 10/1995 | Brown et al. |
| 5,534,708 | A | 7/1996 | Ellinger et al. |
| 5,711,456 | A | 1/1998 | Bryant |
| 5,719,781 | A | 2/1998 | Leatherman et al. |
| 5,720,176 | A | 2/1998 | Manson et al. |
| 5,722,469 | A | 3/1998 | Tuminaro |
| 5,754,055 | A | 5/1998 | McAdoo et al. |
| 5,784,742 | A | 7/1998 | Giuliani et al. |
| 5,794,667 | A | 8/1998 | Payne et al. |
| 5,880,480 | A | 3/1999 | Ellinger et al. |
| 5,971,042 | A | 10/1999 | Hartsell, Jr. |
| 6,121,628 | A | 9/2000 | Rising |
| 6,126,818 | A | 10/2000 | Duerrstein et al. |
| 6,163,738 | A | 12/2000 | Miller |
| 6,182,710 | B1 | 2/2001 | Webb |
| 6,223,765 | B1 | 5/2001 | Small et al. |
| 6,361,684 | B1 | 3/2002 | Hawkins et al. |
| 6,470,233 | B1 | 10/2002 | Johnson, Jr. |
| 6,803,775 | B2 | 10/2004 | Sanchez et al. |
| 6,926,827 | B2 | 8/2005 | Gruca et al. |
| 6,935,191 | B2 | 8/2005 | Olivier et al. |
| 6,992,569 | B2 | 1/2006 | Nimberger et al. |
| 6,996,970 | B2 | 2/2006 | Lorenz |
| 7,174,273 | B2 | 2/2007 | Goldberg |
| 7,412,896 | B2 | 8/2008 | Janik et al. |
| 7,518,719 | B2 | 4/2009 | Sprenger et al. |
| 7,765,978 | B2 | 8/2010 | Ruesch et al. |
| 8,149,401 | B2 | 4/2012 | Stevens et al. |
| 8,720,499 | B2 | 5/2014 | Kastner et al. |
| 2004/0232075 | A1 | 11/2004 | Wells |
| 2005/0040834 | A1 | 2/2005 | Sanchez et al. |
| 2005/0092074 | A1 | 5/2005 | Beaucaire et al. |
| 2005/0150304 | A1 | 7/2005 | Gustafson et al. |
| 2005/0242110 | A1 | 11/2005 | Waugh et al. |
| 2007/0044865 | A1 | 3/2007 | Ruesch et al. |
| 2007/0119859 | A1 | 5/2007 | Harrell |
| 2008/0230146 | A1 | 9/2008 | Kastner et al. |
| 2014/0226149 | A1* | 8/2014 | Coates .................. G01F 23/292 356/51 |

FOREIGN PATENT DOCUMENTS

| | | | |
|---|---|---|---|
| EP | 2122325 | B1 | 3/2013 |
| WO | 2008089259 | A2 | 7/2008 |
| WO | 2010013084 | A1 | 2/2010 |

OTHER PUBLICATIONS

Author Unknown, "Aviation," Facet, a Clarcor company, Dec. 13, 2006, accessed Apr. 19, 2012, 2 pages, http://www.facetusa.com/f_aviation_index.htm.

Author Unknown, "Gammon Gauge", Bulletin 25, Gammon Technical Products, Inc., Jul. 2005, 4 pages, http://www.gammontech.com/mainframe/pdf/b025.pdf.

Author Unknown, "Operator Manual: HIAC PM400 On-line Laser Particle Monitor," Hach Ultra, http://www.atotest.com.tr/download/kilavuz/PM4000kilavuzEN.pdf, 90 pages.

Author Unknown, "Quantum 4" Submersible Pumps: Installation, Operation, Service & Repair Parts, Part No. 042-129-1 Rev. E, Veeder Root, Jun. 2001, 33 pages, http://www.veeder.com/object/042-129-1.html.

D-2 Incorporated, "D-2 Incorporated Announces the Introduction of the Monitor/Filter Condition Sensor, JF-M3," Jan. 23, 2007, 4 pages.

Hach-Lange, "HIAC PM4000: On-Line Liquid Particle Monitors," http://www.hach-lange.ma/countrysites/action_q/download%3Bdocument/DOK_ID/14787582/type/pdf/Ikz/MA/spkz/fr/TOKEN/1Qla0rKzGuYbDYf6lujfZQ6rDal/M/Tt4IWA, 2 pages.

Examiner's First Report for Australian Patent Application No. 2008206281, mailed May 31, 2012, 4 pages.

International Search Report for PCT/US 08/51197, issued Jul. 8, 2008, 3 pages.

International Preliminary Report on Patentability and Written Opinion for PCT/US2008/051197, issued Jul. 21, 2009, 8 pages.

Extended European Search Report and Supplementary European Search Report for PCT/US2008051197 (European Application No. 08727755.4), issued Jan. 4, 2012, 8 pages.

Decision to Grant for European Patent Application No. 08727755.4, issued Feb. 28, 2013, 3 pages.

Non-Final Office Action for U.S. Appl. No. 12/015,111, mailed Jul. 12, 2011, 17 pages.

Non-Final Office Action for U.S. Appl. No. 12/015,111, mailed Mar. 15, 2012, 16 pages.

Final Office Action for U.S. Appl. No. 12/015,111, mailed Nov. 21, 2012, 16 pages.

Non-Final Office Action for U.S. Appl. No. 12/015,111, mailed Jun. 4, 2013, 17 pages.

Notice of Allowance and Examiner-Initiated Interview Summary for U.S. Appl. No. 12/015,111, mailed Dec. 20, 2013, 9 pages.

Author Unknown, "EZ-LIGHT™ Indicators—Daylight Visible," P/N 137330 rev. B, Mar. 22, 2011, Banner Engineering Corportation, http://info.bannerengineering.com/cs/groups/public/documents/literature/137330.pdf, 4 pages.

Author Unknown, "MS100 Moisture Sensor," Hydraulic Filtration and Contamination Control: Solutions for Industry, Catalogue FDHB200UK, Section 40, Nov. 2007, Parker Hannifin Corporation, pp. 262-265.

Non-Final Office Action for U.S. Appl. No. 14/245,476 mailed Mar. 13, 2015, 7 pages.

Extended European Search Report for European Patent Application No. 16153062.1, mailed Jun. 15, 2016, 9 pages.

* cited by examiner

108

100 112

| ISO/RANGE CODE | MIN. PARTICLES/u | MAX. PARTICLES/mL |
|---|---|---|
| 1 | 0.01 | 0.02 |
| 2 | 0.02 | 0.04 |
| 3 | 0.04 | 0.08 |
| 4 | 0.08 | 0.16 |
| 5 | 0.16 | 0.32 |
| 6 | 0.32 | 0.64 |
| 7 | 0.64 | 1.3 |
| 8 | 1.3 | 2.5 |
| 9 | 2.5 | 5 |
| 10 | 5 | 10 |
| 11 | 10 | 20 |
| 12 | 20 | 40 |
| 13 | 40 | 80 |
| 14 | 80 | 160 |
| 15 | 160 | 320 |
| 16 | 320 | 640 |
| 17 | 640 | 1,300 |
| 18 | 1,300 | 2,500 |
| 19 | 2,500 | 5,000 |
| 20 | 5,000 | 10,000 |
| 21 | 10,000 | 20,000 |
| 22 | 20,000 | 40,000 |
| 23 | 40,000 | 80,000 |
| 24 | 80,000 | 160,000 |
| 25 | 160,000 | 320,000 |
| 26 | 320,000 | 640,000 |
| 27 | 640,000 | 1,300,000 |
| 28 | 1,300,000 | 2,500,000 |

114

APPARATUSES AND METHODS FOR PROVIDING VISUAL INDICATION OF DYNAMIC PROCESS FUEL QUALITY DELIVERY CONDITIONS WITH USE OF MULTIPLE COLORED INDICATOR LIGHTS

PRIORITY APPLICATION

The present application claims priority to U.S. Provisional Patent Application Ser. No. 61/754,208 filed on Jan. 18, 2013 entitled "APPARATUSES AND METHODS FOR PROVIDING VISUAL INDICATION OF DYNAMIC PROCESS FUEL QUALITY DELIVERY CONDITIONS WITH USE OF MULTIPLE COLORS INDICATOR LIGHTS," which is incorporated herein by reference in its entirety.

RELATED APPLICATION

The present application is related to U.S. Patent Application Ser. No. 60/855,108 filed on Jan. 16, 2007 entitled "AUTOMATED FUEL QUALITY DETECTION AND DISPENSER CONTROL SYSTEM AND METHOD, PARTICULARLY FOR AVIATION FUELING APPLICATIONS," which is incorporated herein by reference in its entirety.

BACKGROUND

Field of the Disclosure

The present disclosure relates to a fuel quality detection and dispenser/refueler control systems and methods wherein the quality of fuel or supporting fueling components are monitored using sensing devices, either individually or in combination, to ensure that the fuel quality is acceptable to be dispensed for use.

Technical Background

Fuel dispensers are used to dispense fuel to vehicles and other equipment requiring fuel for operation. The basic components of a fuel dispenser are as follows. The fuel dispenser contains a fuel conduit that receives fuel from a fuel source and directs the received fuel to an outlet to be dispensed into desired equipment when the fuel dispenser is activated. A pump, either self-contained within the fuel dispenser or located outside the fuel dispenser but coupled to the fuel conduit, provides the pumping force to direct the fuel through the fuel dispenser when activated. Once the fuel is pumped into the fuel conduit inside the fuel dispenser, it encounters a number of fuel handling components located inline the fuel conduit before eventually being delivered. For example, the fuel encounters a meter to measure the amount of fuel being dispensed. A fuel flow control valve is located inline the fuel conduit either on the inlet or outlet side of the meter to control whether the fuel is allowed to pass through the fuel conduit to the outlet of the fuel dispenser. The outlet of the fuel dispenser is typically comprised of a flexible hose that is coupled to the fuel conduit on one end and to a nozzle on the other. A user engages the nozzle handle trigger to allow fuel flow. The nozzle also contains its own fuel flow control valve that is trigger-activated by the user.

An example of a fuel dispenser that is employed in the aviation industry, in particular to fuel aircraft, is illustrated in FIGS. 1A and 1B. As shown, a refueling truck 10 is provided that contains an onboard fuel tank 12 and an onboard fuel dispenser 14. The refueling truck 10 is mobile so that the onboard fuel dispenser 14 can be conveniently located proximate the desired aircraft for refueling the aircraft. Thus, the fuel tank 12 is located onboard. This is different from typical automobile fuel dispensers that are static and are not transported on trucks or other vehicles. As a result, fuel tanks 12 used to provide fuel to automobile fuel dispensers are located separate from the fuel dispenser, typically beneath the ground. An example of a typical automobile fuel dispenser is described in U.S. Pat. Nos. 5,719,781 and 6,470,233, incorporated by reference herein in its entirety. However, a typical automobile fuel dispenser contains similar components and performs similar functionalities to an aircraft refueling truck 10 with an onboard fuel dispenser 14.

As shown in the close-up illustration of the fuel dispenser 14 in FIG. 1B, a meter 16 is coupled inline the fuel conduit 18 to measure the fuel as it is delivered. A registration device or computer 20 is coupled to the meter 16 that converts the amount of fuel delivered through the meter 16 into a volumetric measurement, typically in the form of gallons. The computer 20 may also further convert the volumetric measurement into a price charged to the user for the fuel. The computer 20 typically contains a display that displays the volume of fuel dispensed, and price if applicable. After the fuel exits the meter 16 through the fuel conduit 18, the fuel is delivered to a hose 22 coupled to fuel conduit 18. The user unwinds the hose 22, which is coiled in the example of the refueling truck 10 illustrated, and places the nozzle (not shown) coupled to the end of the hose 22 to the aircraft (not shown) desired to be refueled.

Debris/particulates and undissolved water can collect inside the fuel tank 12. Debris may be present due to debris being passed into the fuel tank 12 when fuel tank 12 is filled itself. Debris may also be present by rust or others failures of the material used to construct the inside of the fuel tank 12. Water may also collect inside the fuel tank 12 as a result of condensation. Both debris and water in fuel can be hazardous to a vehicle and especially aircraft, because it may cause the engine to be disrupted and/or not perform in a safe manner. For this reason, it is important to prevent debris and water from being dispensed into a vehicle or aircraft fuel tank that will reach its engine. Manual inspection tests, water tests, and particle contaminant tests are employed to inspect fuel quality periodically by refueling personnel. For example, some fuel is dispensed into a jar or clear container called a "sight jar" that is typically mounted on the refueling truck 10 to visually inspect the fuel for impurities. Manual waters tests are employed to detect the presence of water. A manual particle test may ups taps in the fuel streams and strip color to visually determine particle levels. These tests are subjective and subject to human error. Further, the test results are typically logged in a log book, thereby increasing the possibility for error due to the human factor. Log books can also be disputed. Further, these tests may only be performed after bad or unacceptable fuelings have taken place.

As a result, filters are employed as an automatic method to prevent debris and water from passing through to the aircraft. An example of a fueling filter is the Filter water separator/filter monitor filter manufactured by Facet, Velcon, or Faudias described at http://www.facetusa.com/f_aviation_index.htm, which is incorporated herein by reference in its entirety. The filter is coupled inline the fuel conduit 18. The 1583 monitor filter not only collects debris, but also contains an absorbent material that collects water present in the fuel. However, filters can clog. Filters can clog by collecting and blocking debris or water which closes off the size of the fuel flow path internal to the filter. As a result, the pressure differential across the filter increases. If the pressure goes too high, say 15 p.s.i. for example, the filter itself may break down causing debris to be passed on in the fuel to the vehicle or aircraft. Thus, a differential pressure sensor is often further employed to measure the pressure increase across the filter to indicate that the filter is clogged or may not be working properly. An increase in pressure beyond a certain threshold is indicative of a blockage. The filter can then be manually changed with a new, unclogged filter as a result.

One example of such a filter that employs a differential pressure monitor is the differential pressure filter gauge manufactured by Gammon, described at http://www.gammontech.com/mainframe/pdf/b025.pdf, which is incorporated herein by reference in its entirety. The filter apparatus contains a steel ball that is visible to refueling personnel and which floats higher in proportion to higher pressure across the filter. If the float reaches a level that indicates too high of a differential pressure across the filter, say 14 p.s.i. for example, the refueling personnel interlocks the fuel conduit 18 and replaces the filter. Refueling personnel often attempt to continue refueling without replacing the filter, say for example when the differential pressure reads 12 p.s.i., as a result of the refueling personnel slowing the flow rate. This decreases the pressure across the filter thus making it less likely the filter will break down. Or, refueling personnel will prematurely replace the filter when the differential pressure is not high enough to warrant such action, thereby increasing downtime and operation costs. These filters suffer from manual inspection as well as the subjective decision making of the refueling personnel.

As a result of this manual inspection by refueling personnel, some filters further include a proximity sensor that automatically detects when the steel ball reaches the unsafe pressure level and before the filter breaks down. The proximity sensor causes the fuel dispenser 14 to shut down to disallow fueling until refueling personnel replace the filter.

While these present methods of ensuring fuel quality are acceptable for fuel to be dispensed, manual tests are required that are subject to human error, subjective decision making, non-guaranteed execution, and further may only be performed after bad refuelings have taken place. In addition, the methods either rely on refueling personnel to replace filters at the correct time, or if a system is employed to shut down the truck when the differential pressure across the filter exceeds the safe level automatically, fuel flow is ceased abruptly and without warning, thus additionally inconveniencing the refueling personnel and the aircraft expecting to be refueled. Also, refueling personnel make subjective decisions to slow flow rate based on a visual inspection of the differential pressure across the filter to lessen the likelihood of a filter break down. As a result, the fuel quality of fuel delivered may be inconsistent and throughput efficiency may be reduced by not timely and in a predicted manner, replacing the filter.

SUMMARY OF THE INVENTION

Embodiments of the present disclosure include a fuel dispensing apparatus for delivering fuel from a fuel source, and related components, systems, and methods. As fuel is delivered from the fuel source, fuel quality is monitored using one or more fuel quality sensor devices, which detect one or more corresponding fuel quality characteristics. In response to the detected fuel quality characteristics, a visual indication of fuel quality is provided at a visual indication device. The visual indication includes a unique combination of a color component and a frequency component, thereby allowing a user of the fuel dispensing apparatus to quickly determine fuel quality status as the fuel is delivered from the fuel source. Without limitation, one example of a visual indication comprises an LED device that progresses from a first color, e.g., green, to a second color, e.g., yellow, to a third color, e.g. red, in response to a detected fuel quality characteristic varying from a safe level, to an intermediate level, to a dangerous or harmful level. In this example, within each color range, the LED device may flash at progressively increasing frequencies to further indicate specific levels of the fuel quality characteristic.

In one exemplary embodiment, a fuel dispensing apparatus for delivering fuel from a fuel source is disclosed. The fuel dispensing apparatus comprises a flow conduit defining a fluid flow path from a fuel source to an outlet where fuel is dispensed. The fuel dispensing apparatus further comprises a fuel filter located along the fluid flow path. The fuel dispensing apparatus further comprises an electrically-controlled valve located along the fluid flow path. The fuel dispensing apparatus further comprises at least one fuel quality sensor device configured to detect at least one fuel quality characteristic as the fuel passes through the flow conduit. The fuel dispensing apparatus further comprises at least one visual indication device for providing a visual indication to a user of the fuel dispensing apparatus. The fuel dispensing apparatus further comprises an electronic control system in communication with each of the at least one fuel quality sensor device and the at least one visual indication device. The electronic control system is configured to receive fuel quality sensor information corresponding to at least one detected fuel quality characteristic. The electronic control system is further configured to provide at least one visual indication at the visual indication device corresponding to the fuel quality sensor information. Each visual indication comprises a unique combination of a color component and a frequency component.

In another exemplary embodiment, an electronic control system configured to communicate with at least one fuel quality sensor device and at least one visual indication device of a fuel dispensing apparatus is disclosed. The electronic control system is further configured to receive fuel quality sensor information corresponding to the at least one detected fuel quality characteristic. The electronic control system is further configured to provide at least one visual indication at the visual indication device corresponding to the fuel quality sensor information. Each visual indication comprises a unique combination of a color component and a frequency component.

In another exemplary embodiment, a method of providing a visual indication of an operating status of a fuel dispensing apparatus for delivering fuel from a fuel source is disclosed. The method comprises detecting at least one fuel quality characteristic at at least one fuel quality sensor device as the fuel passes through a flow conduit. The method further comprises receiving fuel quality sensor information corresponding to the at least one detected fuel quality characteristic from the at least one fuel quality sensor device. The method further comprises providing at least one visual indication at a visual indication device corresponding to the fuel quality sensor information. Each visual indication comprises a unique combination of a color component and a frequency component.

Those skilled in the art will appreciate the scope of the present invention and realize additional aspects thereof after reading the following detailed description of the preferred embodiments in association with the accompanying drawing figures.

BRIEF DESCRIPTION OF THE FIGURES

The accompanying drawing figures incorporated in and forming a part of this specification illustrate several aspects of embodiments disclosed herein, and together with the description serve to explain the principles of embodiments disclosed herein.

DETAILED DESCRIPTION

Embodiments of the present disclosure include a fuel dispensing apparatus for delivering fuel from a fuel source, and related components, systems, and methods. As fuel is delivered from the fuel source, fuel quality is monitored using one or more fuel quality sensor devices, which detect one or more corresponding fuel quality characteristics. In response to the detected fuel quality characteristics, a visual indication of fuel quality is provided at a visual indication device. The visual indication includes a unique combination of a color component and a frequency component, thereby allowing a user of the fuel dispensing apparatus to quickly determine fuel quality status as the fuel is delivered from the fuel source. Without limitation, one example of a visual indication comprises an LED device that progresses from a first color, e.g., green, to a second color, e.g., yellow, to a third color, e.g. red, in response to a detected fuel quality characteristic varying from a safe level, to an intermediate level, to a dangerous or harmful level. In this example, within each color range, the LED device may flash at progressively increasing frequencies to further indicate specific levels of the fuel quality characteristic.

Figure 1A:
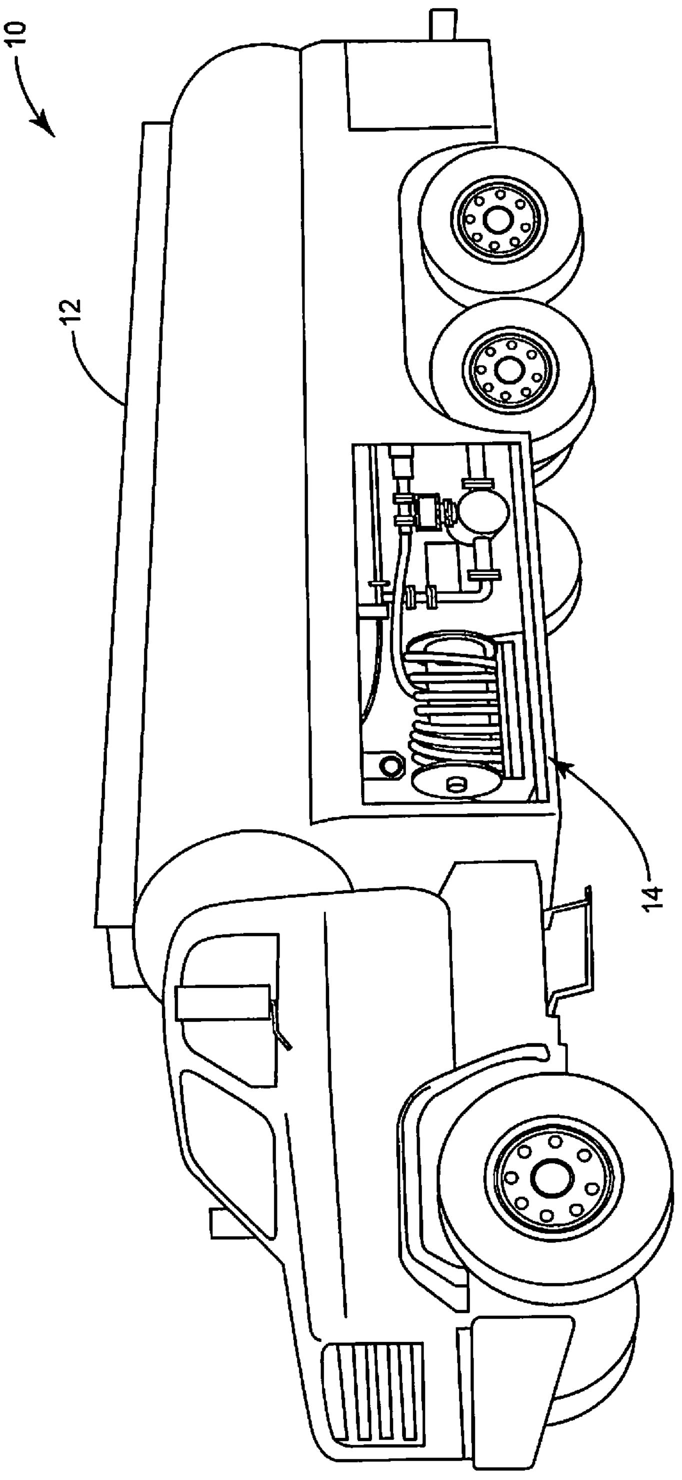
FIG. 1A PRIOR ART
FIGS. 1A and 1B are schematic diagrams of a fueling truck and a fuel dispenser onboard the fueling truck in the prior art used to dispense fuel into aircraft.
Figure 1B:
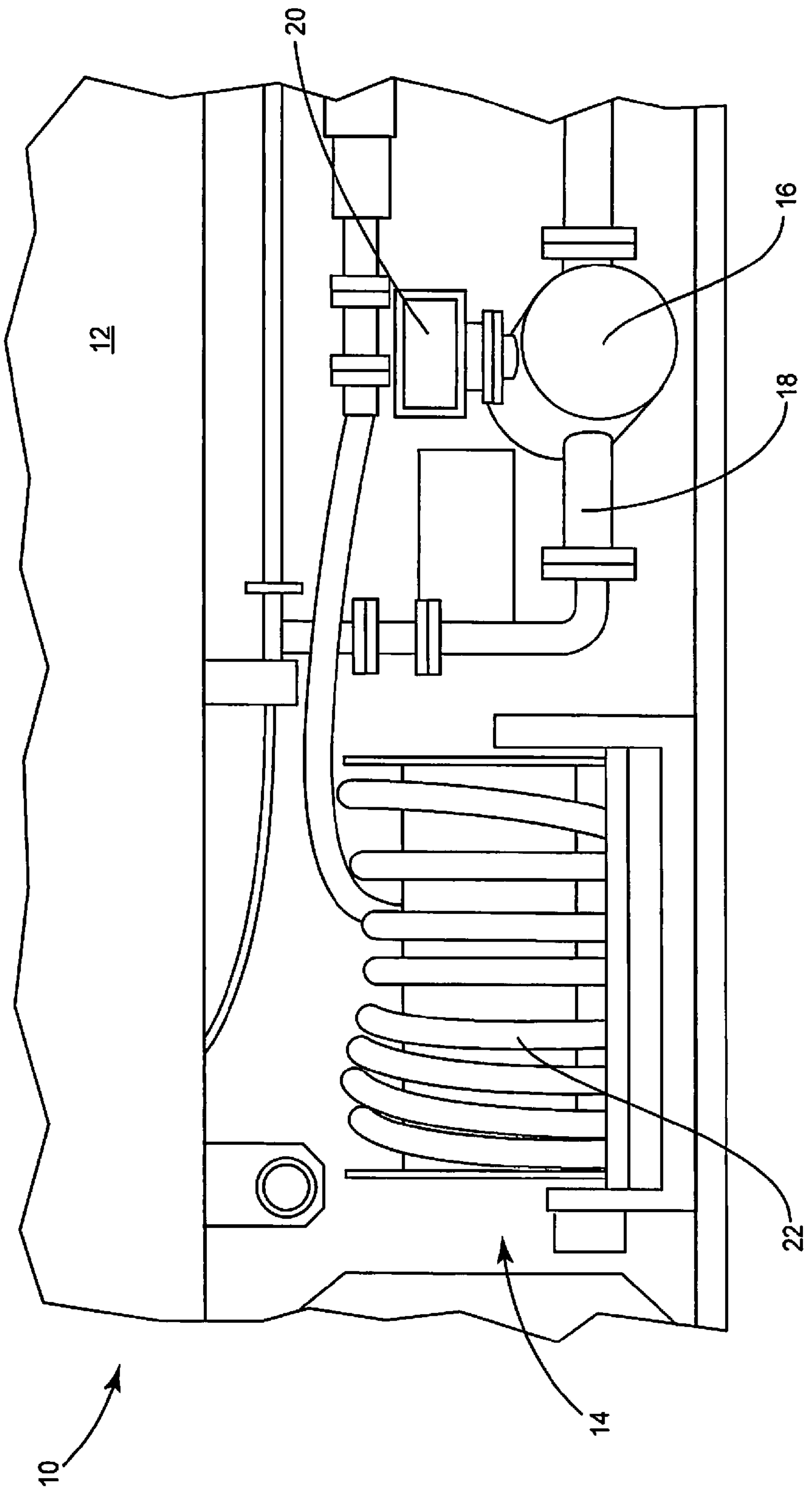
FIG. 1B PRIOR ART
Figure 2:
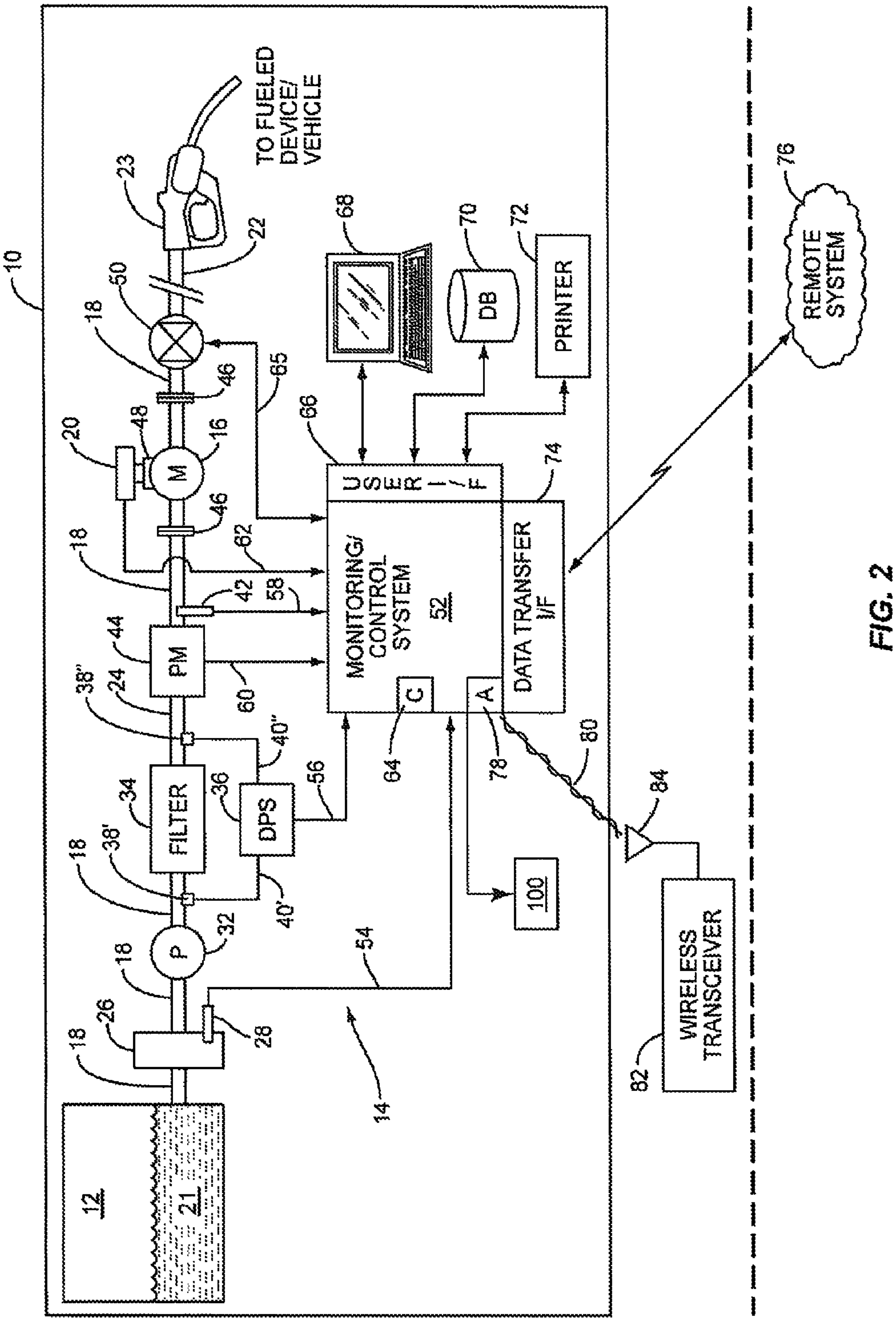
FIG. 2 is a schematic diagram of a quality detection and prevention monitoring and control system according to one embodiment that may be employed on the fueling truck illustrated in FIGS. 1A and 1B to monitor the quality of fuel or supporting fueling components in the fuel delivery flow path.

Before discussing the particular aspects of the exemplary apparatuses and methods for providing visual indicating of dynamic process fuel quality delivery conditions with use of multiple color indicator lights during fuel dispensing, a basic architecture of the fuel dispenser 14 in accordance with one embodiment is illustrated in FIG. 2 and described below. Turning to FIG. 2, element 10 is intended to represent the refueling truck 10 since the disclosed embodiment is a fuel dispenser for aviation applications. However, the embodiments disclosed herein may be employed in any type of fuel dispenser for any application desired. The refueling truck 10 contains its own fuel tank 12 that contains fuel 21 to be dispensed. The fuel conduit 18 is coupled to the fuel tank 12 to receive fuel 21 when dispensing is desired.

A sump 26 may be provided to allow for an optional moisture or water sensor 28 to detect the presence of water in the fuel 21 at the initial point of delivery. Moisture or water in the fuel 21 is typically detected by percentage via the parts per million (PPM) present. Once the moisture or water level reaches a certain water PPM threshold, say 30 PPM in the aviation industry for example, the fuel 21 is deemed to contain too much water to be safe for use. However, the moisture or water sensor 28 takes no corrective action to remove the water or moisture from the fuel 21. That will be the job of the fuel filter 34, discussed below. The fuel 21 is allowed to continue in the fuel conduit 18. However, the moisture or water sensor 28 is coupled to the control system 52. The moisture or water sensor 28 allows the control system 52 to determine if the fuel filter 34 is properly removing or absorbing water, as will be described later below. The moisture or water sensor 28 may for example be the moisture sensor manufactured by Parker, and disclosed at http://www.parker.com/euro_filtration/netwweb/uccweb/pdf/FDCB125GB2MS100.pdf, incorporated herein by reference in its entirety.

A pump 32 is provided on the outlet side of the sump 26 that pumps the fuel 21 from the fuel tank 12 into the fuel conduit 18 and towards the nozzle 23 for dispensing. The pump 32 can be any type of pump, including a vacuum or pressure based pump, and/or a mechanical or electro-mechanical pump, including a turbine pump and/or venturi based pump. For aviation fueling applications, the pump 32 is onboard the refueling truck 10. For vehicle fueling applications, the pump 32 may be inside the fuel dispenser or may be located proximate the fuel storage tank underneath the ground in the form of a submersible turbine pump. An example of a submersible turbine pump manufactured by Veeder-Root Company is the Quantum submersible turbine pump disclosed at http://www.veeder.com/page/PumpManuals, Quantum 4" Submersible Pumps Installation, Operation, Service & Repair Parts (042-129-1 Rev E) (PDF), and the pump described in U.S. Pat. No. 6,223,765, both of which are incorporated herein by reference in their entireties.

After the fuel 21 leaves the pump 32, the fuel 21 will enter the fuel filter 34, which filters a debris and/or water. The filter 34 may be may be the Facet FWS or Filter Monitor filter, disclosed at http://www.facetusa.com/f_aviation_index.htm, incorporated herein by reference in its entirety. The filter collects any debris or water that is present in the fuel 21. The filter 34 contains a water absorbent material that decreases the internal fuel flow path (not shown) in the filter 34, thereby causing an increased pressure drop across the filter 34. Debris collected by the filter 34 also causes the pressure drop across the filter 34 to increase. Fuel 21 passes through the filter 34 without obstruction unless debris or water has been collected and is being retained in the filter 34. The filter 34 is a replaceable device that is exchanged for a clean, unclogged filter periodically so that the filter 34 will continue to operate to separate and prevent debris and water from reaching the nozzle 23 and being dispensed with the fuel 21 as intended.

The filter 34 is also typically designed to handle up to 15 p.s.i. in the internal fuel flow path (not shown) before the elements of the filter 34 start to break down and block or clog the filter 34. The filter 34 is designed for a breakdown pressure point in order to cause its differential pressure to increase when the filter 34 has failed. In order to detect the differential pressure across the filter 34, a differential pressure sensor 36 may be employed as illustrated in FIG. 2. As previously discussed, the differential pressure sensor 36 senses the pressure drop across the inlet 38' and outlet side 38" of the filter 34. The differential pressure sensor 36 records the pressure differential between the inlet 38' and outlet 38" via signals provided on lines 40' and 40" and creates a signal on a differential pressure signal line 56 to communicate the differential pressure to the control system 52 for use in the fuel quality logic.

After the fuel 21 leaves the outlet 38" of the filter 34, the fuel 21 enters a particle monitor 44. The particle monitor 44 detects particle contaminants in the fuel 21 by determining the particle count in units of parts per million (PPM). The higher the particle count, the lower the fuel 21 quality. If the particle count in the fuel 21 reaches a certain threshold, say 15 PPM or equivalent particle counts PPM in the aviation industry for example, the fuel 21 is deemed to contain too many particles to be safe for use. One example of a particle monitor 44 that may be employed in the embodiments disclosed herein is the Hach Ultra Analytics PM4000 particle monitor described at www.hachultra.com, incorporated herein by reference in its entirety. The particle monitor 44 is electrically coupled to the control system 52 via particle monitor line 60 so that the control system 52 receives the particle count in the fuel 21 as fuel dispensing is performed. The control system 52 also uses the particle count in its fuel quality logic.

After the fuel 21 leaves the particle monitor 44, the fuel 21 passes through another water sensor 42. This water sensor 42 is placed inline to the fuel conduit 18 as opposed to the moisture or water sensor 28 in the sump 26. The water sensor 42 is coupled to the control system 52 via water sensor line 58. The water sensor 42 again determines the water content in the fuel 21 as a function of percentage parts (PPM). However, by placement of this water sensor 42 on the outlet side of the particle monitor 44, the control system 52 can determine if any moisture or water that was detected in the sump 26 via the moisture or water sensor 28, was properly absorbed by the filter 34. Thus, the control system 52 can in effect determine the water absorption performance of the filter 34 and generate an alarm or check filter status if the filter 34 is not properly absorbing water. If water was present at the moisture or water sensor 28, but none is detected at the water sensor 42, the filter 34 absorbed the water present in the fuel 21. If less than all the detected water at the moisture sensor 28 was absorbed, via the water sensor 42 detecting some but not the same amount of water at moisture sensor 26, the filter's 34 performance in this regard can be measured by the control system 52 to take any corrective and/or control actions necessary and programmed.

The fuel 21 then continues in the fuel conduit 18 through a manifold 46 that allows the meter 16 to be coupled inline to the fuel conduit 18 on its inlet side. The meter 16 is also coupled to the fuel conduit 18 using another manifold in its outlet side. As the fuel 21 passes through the meter 16, the meter 16 converts the flow of fuel 21 into either an electrical or mechanical signal 48 representing the volume of fuel 21 passing through the meter 16 and communicates this signal to the computer 20 to display the volume of fuel 21 dispensed. The computer 20 may also display the price of the fuel 21 dispensed based on the volume and a set price per volume to be charged to the customer.

Note that the filter 34 and particle monitor 44 are placed on the inlet side of the meter 16. This is so that any water or debris that the filter 34 can remove from the fuel 21 is performed before the fuel 21 reaches the meter 16 to be metered. Metering of contaminated fuel may be in violation of agreements with customers to be charged for a certain quality of fuel, or at a minimum is a good business practice to avoid, which the embodiments disclosed herein can include. Further, contaminants passed through the meter 16 will cause meter wear, thereby making the meter inaccurate over time. This is because the meter 16 is typically a positive displacement meter where a known volume is displaced. Contaminants cause the internal volume to increase, thereby dispensing more fuel than charged when this occurs. As a result, calibration would also be required more often if the filter 34 is not placed on the inlet side of the meter 16.

The fuel 21 next encounters a fuel flow control valve 50. The fuel flow control valve 50 is typically a solenoid controlled proportional valve that is controlled by the control system 52 to open and close, and if opened, to the degree desired. The fuel flow control valve 50 may be other type of valve, including those controlled by stepper motors, so long as the valve can be partially closed to enforce a low flow condition. If the control system 52 desires to allow fuel flow at full flow rate, the control system 52 will send a signal, which is typically a pulse width modulated (PWM) signal in the case of a solenoid controlled proportional valve, over the flow control valve signal line 65 to fully open the valve 50. If flow is not allowed, the valve 50 will be closed. If flow is allowed at less than full flow rate, the valve 50 will be partially closed. As will be discussed later below in the fuel quality logic, the control system 52 controls the fuel flow control valve 50 to execute the fuel control logic to control fuel dispensed. The control of the fuel flow control valve 50 completes the closed loop nature of the this embodiment, wherein sensing devices 28, 36, 42, 44 are inputs to the control system to provide an indication of fuel quality and filter 34 status, and the output is from the control system 52 to the fuel flow control valve 52 to control fuel in response. The control system 52 can also generate reports and alarms, and send messages both locally and off-site to report the status of the sensing devices 28, 36, 42, 44, fuel quality as a result of analysis of the sensing devices 28, 36, 42, 44 according to executed fuel quality logic.

In this regard, the control system 52 may contain an internal clock 64 to use for determining times or the resolution of accepting or receiving readings from the sensing devices 28, 36, 42, 44, or to perform other time based functions. The control system 52 also contains user interface electronics 66 that are used to allow the control system 52 to interface to external input and output devices that are either customer accessible and used to access the control system 52 or to provide recording and storage of information. For example, a terminal or computer 68 may be interfaced to the control system 52. This will allow a user to access information about the fuel quality from the control system 52 and program parameters for the fuel quality logic. A database 70 may be provided and interfaced to the control system 52 via the user interface 66 to store fuel quality information and/or information about the sensing devices 28, 36, 42, 44. A printer 72 may be coupled to the control system 52 to print out reports and/or alarms about fuel quality and/or sensing device 28, 36, 42, 44 readings. Further, the control system 52 may be adapted to send any of this information to a remote system 76 located remotely from the fuel dispenser 14 via data transfer interface 74. These communications may be Internet or telephone based, either based on public or private networks. Further, the control system 52 may contain an antenna 78 that allows wireless communication of the aforementioned information to a wireless transceiver 82 via a modulated RF signal 80, wherein the wireless transceiver 82 contains its own antenna to receive the signal 80.

Note that any of the sensing devices 28, 36, 42, 44 are optional. Any of the fuel quality logic may be implemented partially or fully in the example fuel quality logic in FIG. 3. Moisture or water sensor 28 is used by the control system 52 to be able to determine the water absorption performance of the fuel filter 34. The embodiments disclosed herein can be implemented in any fuel dispenser. Any type of control system may be used with the embodiments disclosed herein. The control system 52 may be located on the fuel dispenser 14 or may be located in a separate location either proximate the fuel dispenser 14 or remotely. The control system may be accessed by a user either on-site or remotely. In this embodiment, a visual indication device 100 in communication with the control system 52 provides a visual indication of a visual indication of fuel quality at a visual indication device in response to detected fuel quality characteristics, thereby allowing a user of the fuel dispensing apparatus to quickly determine fuel quality status as the fuel is delivered from the fuel source. One advantage of using a visual indication of fuel quality characteristics is to permit a user to quickly and easily determine the status of fuel being delivered with respect to different contaminants and failure modes, including but not limited to water contamination, particulate contamination, or filter status. One advantage to a simple, color and/or flashing frequency based visual indication is that the fuel quality state can be quickly determined by a user from a distance, without the need for a close examination of the visual indication device 100.

The apparatuses and methods disclosed herein may provide visual indicating of dynamic process fuel quality delivery conditions with use of multiple color indicator lights. The embodiments disclosed herein can be used to display concentration levels of particulates and water during the delivery of petroleum fuels for use in internal combustion engines and turbines used to power heavy machinery and aircraft. The apparatuses and methods can also be used to display the status of the pressure differential across in-line fuel filters when compared to the filter manufacturers recommendation for a given flow rate.

Figure 3:
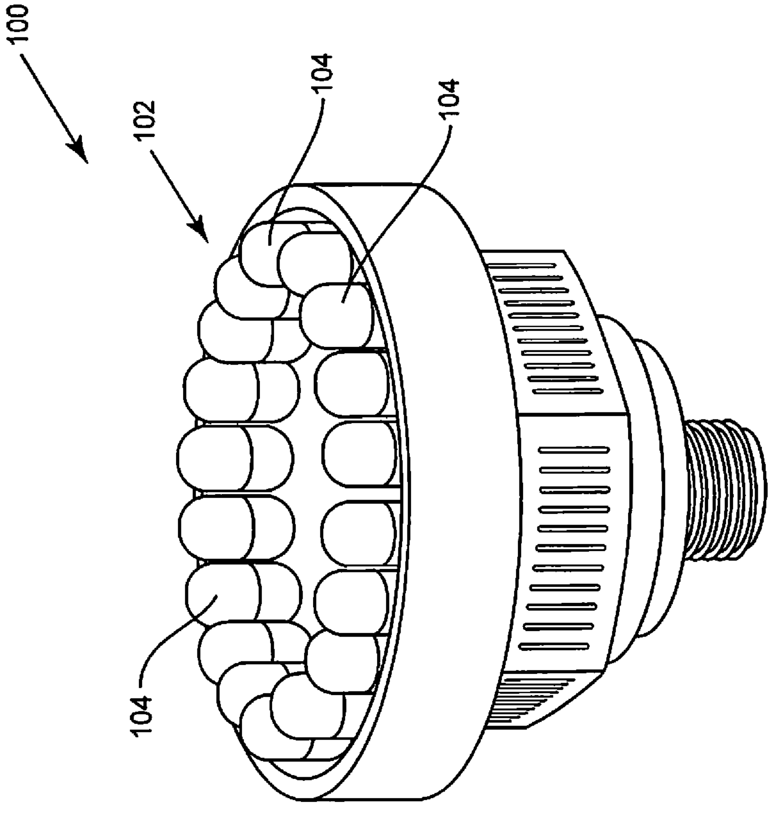
FIG. 3 is an exemplary light fixture containing a ring of color LEDs for exhibiting different fuel quality operation conditions.

One embodiment of a visual indication device 100 uses an indicator light fixture 102 such as those manufactured by Banner Engineering type EZ-Light™ Indicators—Daylight Visible, part number K50LDGRYPQ, http://www.bannerengineering.com/en-US/products/112/Lighting-indicators/712/Daylight-Visible, shown in FIG. 3.

Figure 4:
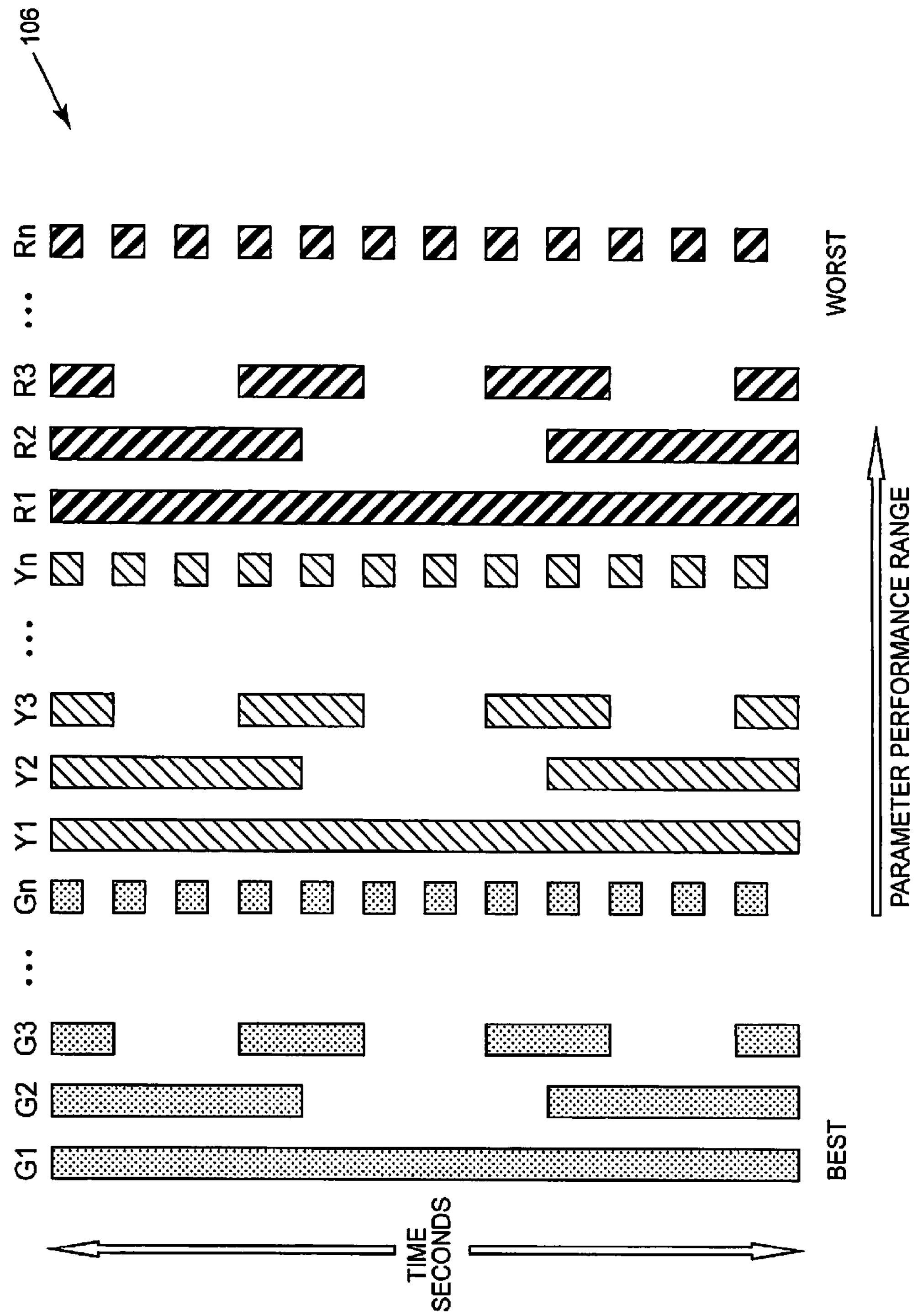
FIG. 4 is a chart of exemplary LED color sequences to visually indicate different fuel quality delivery conditions.

The described indicator light fixture 102 in FIG. 3 contains a ring of alternating color LEDs 104, green, yellow, and red in this embodiment, which can be independently switched on and off by a separate process controller, such as control system 52 in FIG. 2, based on defined process variable set points or derived dynamically through algorithms calculated from historic process variables. The embodiments to apparatuses and methods for providing visual indication of dynamic process fuel quality delivery conditions with use of multiple colors indicator lights will now be discussed could also work with fewer or greater than three independent colors. The exemplary embodiment disclosed in FIG. 3, for example, uses three colors: green for one or more "good" or "safe" states; yellow for one or more "intermediate" states; and red for one or more "poor" or "danger" states. In this manner, the indicator light fixture 102 can provide a visual indication having a color component to a user for different predetermined fuel quality characteristic ranges, as will be described in greater detail with respect to FIGS. 4 and 5.

In a preferred embodiment, each different colored LEDs 104 is turned on or off in unison, but independent of the other color groups. In this embodiment, each LED 104 is capable of displaying only one color, i.e., red, green, or yellow, but in other embodiments, each LED 104 may be a multi-color LED, or other type of lighting element, that may be capable of independently displaying multiple colors. In this manner, each color of LED 104 can exhibit many such modes of operation (on and off sequences) each defined by a unique time base (i.e., flashing frequency) for the period of time the light is on or off. In the example chart 106 in FIG. 4, the green color group of LEDs has a plurality of modes G1 to Gn of flashing sequences, each having a progressively higher flashing frequency. Mode G1 indicates the green LEDs as constantly on (i.e., having a flashing frequency of zero) reflecting the "best" condition of the measured process variable. Mode G2 identifies the next frequency mode of operation indicating a slightly deteriorated process variable condition. The modes continue with higher and higher flashing frequencies to mode Gn, the worst mode in the green color group, having the highest flashing frequency. The yellow and red LEDs have modes of operation that may either have identical flashing frequencies or be defined uniquely. In this embodiment, the frequency component of the first safe state has a frequency of zero, and the frequency component of each subsequent safe state has a frequency higher than the previous safe state, the frequency component of the first intermediate state has a frequency of zero, and the frequency component of each subsequent intermediate state has a frequency higher than the previous intermediate state, and the frequency component of the first danger state has a frequency of zero, and the frequency component of each subsequent danger state has a frequency higher than the previous danger state.

In this manner, each separate safe state has a unique frequency component with respect to every other safe state, each separate intermediate state has a unique frequency component with respect to every other intermediate state, and each separate danger state has a unique frequency component with respect to every other intermediate state. The plurality of visual indication states output from the indicator light fixture 100 in this embodiment is configured to proceed through a sequential progression from at least one safe state each having a first color component, through at least one intermediate state each having a second color component, to at least one danger state each having a third color component. When viewed as a whole; the three (3) color indicator light system provides a visual method of decreasing parameter measurements with transitions from green to yellow to red.

Transitions from one mode to another, modes G1 to G2 for example, can be predefined and coded into the process controller. For example, if the process variable monitored were particulate concentrations in jet fuel measured in parts per million, the transition from modes G1 to G2 could be forced to occur when particulate concentrations exceed 100 parts per million. Similarly, transition to other modes would occur with higher thresholds are exceeded. Once mode Gn is reached, the next threshold would transition from modes Gn to Y1. Similarly, mode Yn would transition to mode R1.

Alternatively, thresholds may be established dynamically and within user defined boundaries based on historical data. For example, if particulate concentrations were to increase by 5% above a 5 day rolling average in a short period of time (10 minutes) would trigger a transition to the next display state. This would allow small changes to occur over time without transition but would provide increased sensitivity to short term changes. Rolling averages could be limited within a color band where mode Gn has a fixed (not dynamic) threshold to eliminate large changes over a long period of time.

Figure 5:
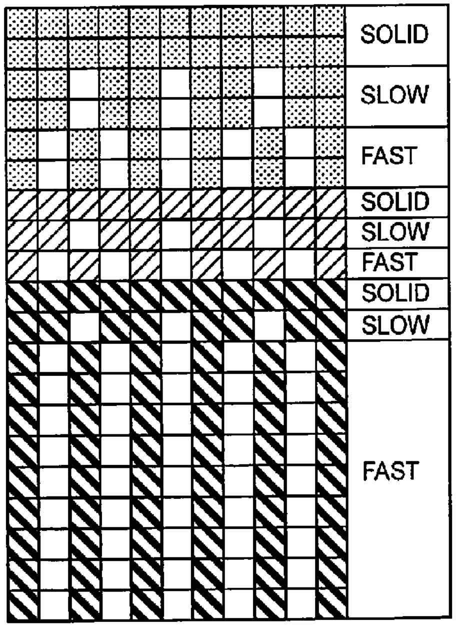
FIG. 5 is another chart of exemplary LED color sequences to visually indicate different fuel quality delivery conditions.

FIG. 5 is another exemplary chart 108 of exemplary LED color group sequences to visually indicate different fuel quality delivery conditions. ISO/Range Codes 110 each correspond to a range of particles/mL 112, and cause the visual indication device 100 to display a specific visual indication state 114 having a color component and a frequency component. For example, for ISO/Range Codes 1-10, corresponding to detected particles/mL of 10 or less, produce a solid green indication, i.e., a visual indicator having a green color component and a frequency color component of zero. For ISO/Range codes 11 and 12, corresponding to detected particles/mL of 10-40, the color component remains green, but the frequency component increases to a "slow" frequency, i.e., "on" for two time segments and "off" for one time segment in a repeating pattern, to indicate the marginal increase in particulate contamination. For ISO/Range codes 13 and 14, corresponding to detected particles/mL of 40-160, the color component remains green, and the frequency component increases to a "fast" frequency, i.e., "on" for one time segment and "off" for one time segment in a repeating pattern, to indicate that the particular contamination is approaching the upper limit of the "safe" state. For ISO/Range code 15, corresponding to detected particles/mL of 160-320, the frequency returns to "solid," i.e., zero frequency, but the color component changes to yellow to indicate the shift from a "safe" state to an "intermediate" state. In this embodiment, the progression continues through ISO/Range codes 20 and above, which correspond to detected particles/mL of 5,000 or more, and which have a red color component and a "fast" frequency component, to indicate a dangerous contamination condition.

The embodiments disclosed herein may also be employed on a hydrant cart refueling truck that obtains its fuel to delivery from a separate storage tank. The embodiments disclosed herein, and particularly the control system and the components necessary to determine the fuel quality and related statuses described above, may also be provided on a new refueling truck during manufactured or may be retrofitted to existing refueling trucks. Further, the control system and/or monitoring devices of the embodiments disclosed herein may be powered by a power system on the refueling truck, an external source, or by battery power as examples.

Those skilled in the art will recognize improvements and modifications to the preferred embodiments of the embodiments disclosed herein. All such improvements and modifications are considered within the scope of the concepts disclosed herein.

What is claimed is:

1. A fuel dispensing apparatus for delivering fuel from a fuel source, comprising:

a flow conduit defining a fluid flow path from a fuel source to an outlet where fuel is dispensed;

a fuel filter located along the fluid flow path;

an electrically-controlled valve located along the fluid flow path;

at least one fuel quality sensor device configured to detect at least one fuel quality characteristic as the fuel passes through the flow conduit;

at least one visual indication device for providing a visual indication to a user of the fuel dispensing apparatus; and an electronic control system in communication with each of the at least one fuel quality sensor device and the at least one visual indication device, the electronic control system being configured to:

receive fuel quality sensor information corresponding to at least one detected fuel quality characteristic; and provide at least one visual indication at the visual indication device corresponding to the fuel quality sensor information, each visual indication indicative of a fuel quality state corresponding to a predetermined fuel quality characteristic range for each of the at least one detected fuel quality characteristic, each visual indication comprising a unique combination of a color component selected from a plurality of unique color components and a flashing frequency component selected from a plurality of unique flashing frequency components.

2. The fuel dispensing apparatus of claim 1, wherein the at least one visual indication comprises a sequential progression from at least one safe state each having a first color component selected from the plurality of unique color components, through at least one intermediate state each having a second color component selected from the plurality of unique color components, to at least one danger state each having a third color component selected from the plurality of unique color components.

3. The fuel dispending apparatus of claim 2, wherein the first color component is green, the second color component is yellow, and the third color component is red.

4. The fuel dispending apparatus of claim 2, wherein each of the at least one safe state has a unique flashing frequency component selected from the plurality of unique flashing frequency components with respect to every other safe state, each of the at least one intermediate state has a unique flashing frequency component selected from the plurality of unique flashing frequency components with respect to every other intermediate state, and each of the at least one danger state has a unique flashing frequency component selected from the plurality of unique flashing frequency components with respect to every other danger state.

5. The fuel dispensing apparatus of claim 4, further comprising a plurality of safe states, a plurality of intermediate states, and a plurality of danger states, wherein the flashing frequency component of a first safe state has a frequency of zero such that the visual indication device is constantly on, and the flashing frequency component of each subsequent safe state has a frequency higher than the previous safe state;

the flashing frequency component of a first intermediate state has a frequency of zero such that the visual indication device is constantly on, and the flashing frequency component of each subsequent intermediate state has a frequency higher than the previous intermediate state;

the flashing frequency component of a first danger state has a frequency of zero such that the visual indication device is constantly on, and the flashing frequency component of each subsequent danger state has a frequency higher than the previous danger state.

6. An electronic control system configured to communicate with at least one fuel quality sensor device of a fuel dispensing apparatus and at least one visual indication device, the electronic control system being further configured to:

receive fuel quality sensor information corresponding to at least one detected fuel quality characteristic; and provide at least one visual indication at the visual indication device corresponding to the fuel quality sensor information, each visual indication indicative of a fuel quality state corresponding to a predetermined fuel quality characteristic range for each of the at least one detected fuel quality characteristic, each visual indication comprising a unique combination of a color component selected from a plurality of unique color components and a flashing frequency component selected from a plurality of unique flashing frequency components.

7. The electronic control system of claim 6, wherein the at least one visual indication comprises a sequential progression from at least one safe state each having a first color component selected from the plurality of unique color components, through at least one intermediate state each having a second color component selected from the plurality of unique color components, to at least one danger state each having a third color component selected from the plurality of unique color components.

8. The electronic control system of claim 7, wherein the first color component is green, the second color component is amber, and the third color component is red.

9. The electronic control system of claim 7, wherein each of the at least one safe state has a unique flashing frequency component selected from the plurality of unique flashing frequency components with respect to every other safe state, each of the at least one intermediate state has a unique flashing frequency component selected from the plurality of unique flashing frequency components with respect to every other intermediate state, and each of the at least one danger state has a unique flashing frequency component selected from the plurality of unique flashing frequency components with respect to every other danger state.

10. The electronic control system of claim 9, further comprising a plurality of safe states, a plurality of intermediate states, and a plurality of danger states, wherein the flashing frequency component of a first safe state has a frequency of zero such that the visual indication device is constantly on, and the flashing frequency component of each subsequent safe state has a frequency higher than the previous safe state;

the flashing frequency component of a first intermediate state has a frequency of zero such that the visual indication device is constantly on, and the flashing frequency component of each subsequent intermediate state has a frequency higher than the previous intermediate state;

the flashing frequency component of a first danger state has a frequency of zero such that the visual indication device is constantly on, and the flashing frequency component of each subsequent danger state has a frequency higher than the previous danger state.

11. A method of providing a visual indication of an operating status of a fuel dispensing apparatus for delivering fuel from a fuel source, the method comprising:

detecting at least one fuel quality characteristic at at least one fuel quality sensor device as the fuel passes through a flow conduit;

receiving fuel quality sensor information corresponding to at least one detected fuel quality characteristic from the at least one fuel quality sensor device; and providing at least one visual indication at a visual indication device corresponding to the fuel quality sensor information, each visual indication indicative of a fuel quality state corresponding to a predetermined fuel quality characteristic range for each of the at least one detected fuel quality characteristic, each visual indication comprising a unique combination of a color component selected from a plurality of unique color components and a flashing frequency component selected from a plurality of unique flashing frequency components.

12. The method of claim 11, wherein the at least one visual indication comprises a sequential progression from at least one safe state each having a first color component selected from the plurality of unique color components, through at least one intermediate state each having a second color component selected from the plurality of unique color components, to at least one danger state each having a third color component selected from the plurality of unique color components.

13. The method of claim 12, wherein the first color component is green, the second color component is amber, and the third color component is red.

14. The method of claim 12, wherein each of the at least one safe state has a unique flashing frequency component selected from the plurality of unique flashing frequency components with respect to every other safe state, each of the at least one intermediate state has a unique flashing frequency component selected from the plurality of unique flashing frequency components with respect to every other intermediate state, and each of the at least one danger state has a unique flashing frequency component selected from the plurality of unique flashing frequency components with respect to every other danger state.

15. The method of claim 14, further comprising a plurality of safe states, a plurality of intermediate states, and a plurality of danger states, wherein the flashing frequency component of a first safe state has a frequency of zero such that the visual indication device is constantly on, and the frequency component of each subsequent safe state has a frequency higher than the previous safe state;

the flashing frequency component of a first intermediate state has a frequency of zero such that the visual indication device is constantly on, and the frequency component of each subsequent intermediate state has a frequency higher than the previous intermediate state;

the flashing frequency component of a first danger state has a frequency of zero such that the visual indication device is constantly on, and the frequency component of each subsequent danger state has a frequency higher than the previous danger state.

* * * * *